(12) United States Patent
Chien et al.

(10) Patent No.: US 8,054,953 B2
(45) Date of Patent: Nov. 8, 2011

(54) METHOD AND SYSTEM FOR EXECUTING CORRELATIVE SERVICES

(75) Inventors: Shih-Chieh Chien, Taichung County (TW); Chih-Chung Kuo, Hsinchu (TW); Jui-Hsin Hung, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 1325 days.

(21) Appl. No.: 11/625,828

(22) Filed: Jan. 23, 2007

(65) Prior Publication Data

US 2008/0133515 A1 Jun. 5, 2008

(30) Foreign Application Priority Data

Dec. 1, 2006 (TW) ............................... 95144641 A (51) Int. Cl.
*H04M 1/64* (2006.01)
*G06F 15/02* (2006.01)

(52) U.S. Cl. ..................... 379/88.22; 370/338; 370/392; 379/88.17; 455/411; 700/9; 700/91; 705/32; 706/45; 709/223; 712/200; 713/189; 713/2; 717/130; 719/318; 719/320; 725/135

(58) Field of Classification Search .................. 370/392, 370/338; 379/88.17, 88.22; 700/91, 9; 705/32; 707/6; 709/223; 713/2, 189; 717/130; 719/318, 719/320; 706/45; 712/200; 455/411; 725/135

See application file for complete search history.

(56) References Cited

U.S. PATENT DOCUMENTS

| | | | |
|---|---|---|---|
| 5,809,269 A * | 9/1998 | Favot et al. | 712/200 |
| 5,893,083 A * | 4/1999 | Eshghi et al. | 706/45 |
| 6,026,410 A | 2/2000 | Allen et al. | |
| 6,029,171 A | 2/2000 | Smiga et al. | |
| 7,100,039 B2 * | 8/2006 | Fisher | 713/2 |
| 7,231,267 B2 * | 6/2007 | Bournas et al. | 700/91 |
| 7,266,182 B2 * | 9/2007 | Creamer et al. | 379/88.17 |
| 7,275,239 B2 * | 9/2007 | Cuomo et al. | 717/130 |
| 7,523,463 B2 * | 4/2009 | Sluiman et al. | 719/318 |
| 7,707,080 B2 * | 4/2010 | Agarwal et al. | 705/32 |
| 7,721,296 B2 * | 5/2010 | Ricagni | 719/318 |
| 7,779,101 B1 * | 8/2010 | Zahavi et al. | 709/223 |
| 7,933,584 B2 * | 4/2011 | Ji et al. | 455/411 |
| 2006/0126631 A1 * | 6/2006 | Wajda et al. | 370/392 |
| 2006/0156374 A1 * | 7/2006 | Hu et al. | 725/135 |
| 2007/0245357 A1 * | 10/2007 | Breiter et al. | 719/320 |
| 2008/0133515 A1 * | 6/2008 | Chien et al. | 707/6 |
| 2010/0306552 A1 * | 12/2010 | LeVine et al. | 713/189 |

FOREIGN PATENT DOCUMENTS

CN 1658188 8/2005

OTHER PUBLICATIONS

"1st Office Action of China counterpart application", issued on Apr. 15, 2010, p. 1-p. 4.

* cited by examiner

*Primary Examiner* — Gerald Gauthier
(74) *Attorney, Agent, or Firm* — Jianq Chyun IP Office (57) ABSTRACT

A method and a system for executing correlative services are provided. In the method and the system, an event type corresponding to an input message is determined through semantic analysis. After collecting the necessary execution information of the event type according to the input message, a user database, or by inquiring the user or another system, the system automatically executes various correlative services of the event type. Therefore, the system can help users to execute correlative services more correctly and more efficiently.

20 Claims, 6 Drawing Sheets

| MEETING SUBJECT | ATTENDEE | QUOTATION NUMBER | NUMBER OF NO-QUOTATION DAYS | QUOTATION SCORE |
|---|---|---|---|---|
| ROUTINE MEETING OF PROJECT XX | A,B,... | 15 | 10 | 1.36 |
| THE REQUIREMENT OF VENDOR-A | A,B,... | 2 | 2 | 0.67 |
| XX TECHNOLOGY WORKSHOP | B,C,... | 3 | 25 | 0.12 |
| ... | ... | ... | ... | ... |

FIG. 5    500

| MEETING START TIME | MEETING END TIME | QUOTATION NUMBER | NUMBER OF NO-QUOTATION DAYS | QUOTATION SCORE |
|---|---|---|---|---|
| 14:00 | 16:00 | 15 | 10 | 1.36 |
| 09:00 | 12:00 | 2 | 2 | 0.67 |
| 13:30 | 16:00 | 3 | 25 | 0.12 |
| ... | ... | ... | ... | ... |

| MEETING ROOM | QUOTATION NUMBER | NUMBER OF NO-QUOTATION DAYS | QUOTATION SCORE |
|---|---|---|---|
| 51-725 | 21 | 2 | 7.00 |
| 51-303 | 15 | 20 | 0.71 |
| 51-316 | 5 | 30 | 0.16 |
| 51-309 | 1 | 50 | 0.02 |

| ATTENDEES | QUOTATION NUMBER | NUMBER OF NO-QUOTATION DAYS | QUOTATION SCORE |
|---|---|---|---|
| A | 30 | 2 | 10.00 |
| B | 30 | 2 | 10.00 |
| C | 25 | 2 | 8.33 |
| ... | ... | ... | ... |

METHOD AND SYSTEM FOR EXECUTING CORRELATIVE SERVICES

CROSS-REFERENCE TO RELATED APPLICATION

This application claims the priority benefit of Taiwan application serial no. 95144641, filed on Dec. 1, 2006. All disclosure of the Taiwan application is incorporated herein by reference.

BACKGROUND OF THE INVENTION

1. Field of the Invention

The present invention relates to a method and a system for executing correlative services. More particularly, the present invention relates to a method and a system for automatically executing the corresponding correlative services.

2. Description of Related Art

As the world undergoes the revolution of information technology, many organizations or enterprises choose to replace conventional paper works with electronic forms for various human resource management tasks. An employee may apply for a service item by manually filling various data into an electronic form. Compared to conventional paper works, electronic forms not only save the working cost of an organization or enterprise but also bring convenience to data management and storage.

However, if several service items are to be executed in one event, the user has to provide repeatedly all the information required by each service item and confirm the accuracy of the content and result of each service item. For example, before an employee goes for a business trip, the employee has to fills up a business travel record form and delivers this form to a director to be approved, and after the director has approved the form, perhaps a transportation application form has to be filled up and the employee's calendar has to be updated to add the traveling schedule in the memo. Accordingly, the employee has to fill up several electronic forms regarding the same business trip event. Besides, the employee has to be very careful about the accuracy of data while filling up each of the electronic forms, and he/she also has to repeatedly check into the system to find out whether the applications have been approved. With a large workload in a complicated business, such a process not only wastes a lot of time, but also causes the services to be executed incorrectly if the information provided by the employee is incorrect or incomplete.

Moreover, currently a user can only fill text data into electronic forms, which brings restriction in data input method. Furthermore, it makes the usage of electronic forms very inconvenient.

SUMMARY OF THE INVENTION

Accordingly, the present invention is directed to a method for executing correlative services, wherein an event type corresponding to a message input by a user is analyzed through semantic analysis and then correlative services corresponding to the event type are automatically executed.

The present invention further provides a system for executing correlative services, which adopts a learning mechanism to ensure that the analysis result of an input message meets the user's expression habit, and automatically collects all the necessary information for executing the correlative services by communicating with a user or another system for executing correlative services.

The present invention provides a method for executing correlative services. The method includes following steps. An input message is provided, and an event type corresponding to the input message is then determined according to an event type database. All correlative services of the event type are sequentially executed after each necessary execution information of the event type has been obtained.

The present invention further provides a system for executing correlative services. The system includes a message receiving/processing module, an event type database, an event type recognition module, a user database, a management module, and a message transmitting/processing module. The message receiving/processing module is configured for receiving an input message and converting the input message into a plurality of text words, wherein the text words have an appearance order. The event type database records characteristics of an event type. The event type recognition module is connected to the message receiving/processing module and the event type database for determining the event type corresponding to the input message according to the event type database. The user database is used for recording related information of a user. The management module is connected to the message receiving/processing module, the event type recognition module, and the user database for collecting all necessary execution information of an event type and starting up the correlative services of the event type. The message transmitting/processing module is configured for allowing the system for executing correlative services to communicate with the user or another system for executing correlative services through message transmission.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Exemplary embodiments of the present invention will be described below in conjunction with accompanying drawings to make features, aspects, and advantages of the present invention more apparent.

Figure 1:
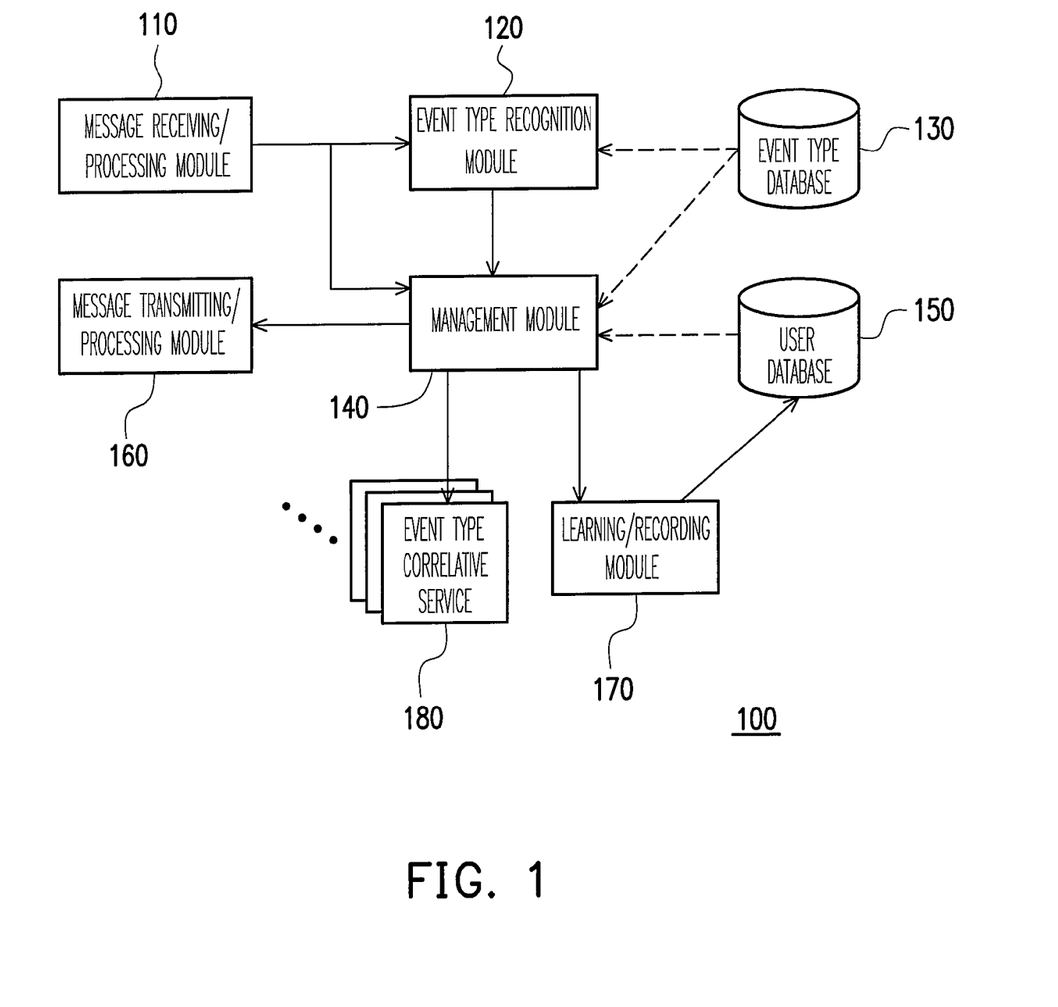
FIG. 1 is a block diagram of a system for executing correlative services according to an exemplary embodiment of the present invention.

FIG. 1 is a block diagram illustrating a system for executing correlative services according to an exemplary embodiment of the present invention. Referring to FIG. 1, the correlative service execution system 100 includes a message receiving/processing module 110, an event type recognition module 120, an event type database 130, a user database 150, a management module 140, a message transmitting/processing module 160, a learning/recording module 170, and event type correlative services 180. The message receiving/processing module 110 is configured for receiving an input message through a multimedia channel such as Short Message Service (SMS), e-mail, phone call, or a human-computer interface such as calendar or webpage. In the present embodiment, the input message may be a text message or a voice message, and the scope of the present invention is not limited herein. The message receiving/processing module 110 converts the input message into a plurality of text words after receiving the input message.

The event type recognition module 120 is connected to the message receiving/processing module 110 and the event type database 130 which records the characteristics of various event types. The event type recognition module 120 determines an event type corresponding to the input message according to the characteristics of various event types recorded in the event type database 130 and the text words converted by the message receiving/processing module 110.

The management module 140 is connected to the message receiving/processing module 110, the event type recognition module 120, the event type database 130, and the user database 150. The management module 140 collects all the necessary execution information of the event type and starts up all the correlative services of the event type correlative services 180 after the event type recognition module 120 has determined the event type corresponding to the input message.

The learning/recording module 170 is connected to both the management module 140 and the user database 150 and is configured for updating the user database 150 according to the execution information collected by the management module 140.

The correlative service execution system 100 can transmit multimedia messages such as texts or voices to a user or another correlative service execution system through the message transmitting/processing module 160, so as to communicate with the user and other correlative service execution systems.

Figure 2:
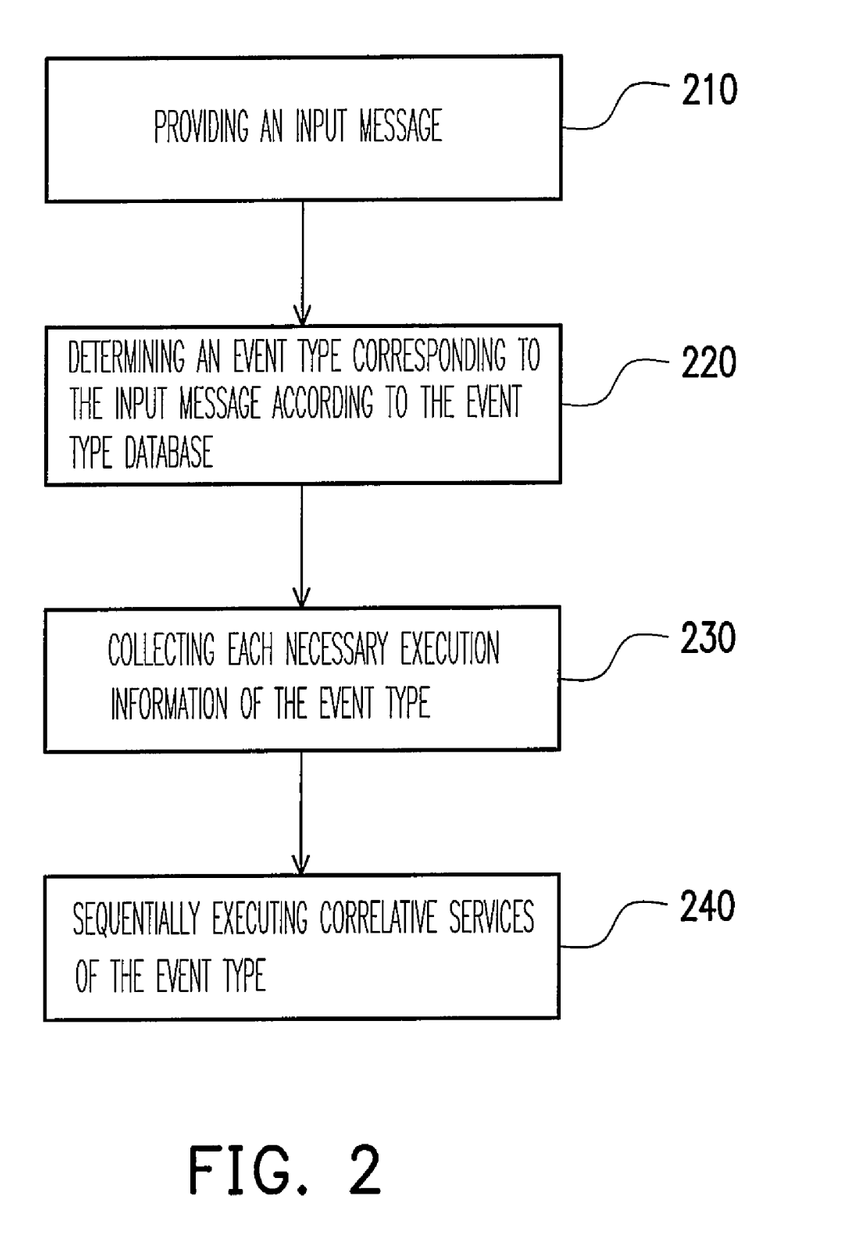
FIG. 2 is a flowchart illustrating a method for executing correlative services according to an exemplary embodiment of the present invention.

To describe the operation flow of the correlative service execution system 100 in details, another embodiment of the present invention will be further explained below. FIG. 2 is a flowchart illustrating a method for executing correlative services according to an exemplary embodiment of the present invention. Referring to both FIG. 1 and FIG. 2, it is assumed in the present embodiment that a user inputs a text message "Tomorrow 14:00 discuss the requirement of vendor-A" into the correlative service execution system 100. First, in step 210, the message receiving/processing module 110 receives the foregoing input message provided by the user and converts the input message into a plurality of text words. When the input message received by the message receiving/processing module 110 is a text message, the text message can be broken into text words with a text parser; when the received input message is a voice message, the voice message can be first interpreted into a text message with a voice recognition apparatus and then broken into text words with a text parser; besides, the voice message may also be directly converted into text words by using a voice recognition apparatus. In the present embodiment, the input message may be converted into a plurality of text words such as "Tomorrow", "14:00", "discuss", "the", "requirement", "of", and "vendor-A" by the message receiving/processing module 110, and these text words are transmitted to the event type recognition module 120.

Next, as in step 220, the event type recognition module 120 determines the event type corresponding to the input message according to information recorded in the event type database 130. In an embodiment of the present invention, the event type database 130 includes a plurality of semantic trees, and each semantic tree represents a distinct event type. Each semantic tree includes a root node and a plurality of child nodes, wherein each child node represents a semantic class. The method for the event type recognition module 120 to determine the event type corresponding to the input message according to the semantic trees in the event type database 130 is described in details below. First, the text words converted by the message receiving/processing module 110 have an appearance order. The semantic classes of the text words are searched downwards from the root node of each semantic tree in the event type database 130 according to the appearance order of the text words and the semantic class of each text word. If a path exists in a particular semantic tree and the semantic classes represented by the child nodes on the path match the semantic classes of those text words according to the appearance order, the input message is then determined to belong to the event type represented by the semantic tree.

For example, the event type database 130 may includes semantic trees respectively corresponding to various event types such as "company internal meeting", "leave application", and "business travel" etc. When the event type recognition module 120 receives the text words "Tomorrow", "14:00", "discuss", "the", "requirement", "of" and "vendor-A" with an appearance order, the event type recognition module 120 searches the semantic trees in the event type database 130 downwards from their root nodes respectively.

Figure 3:
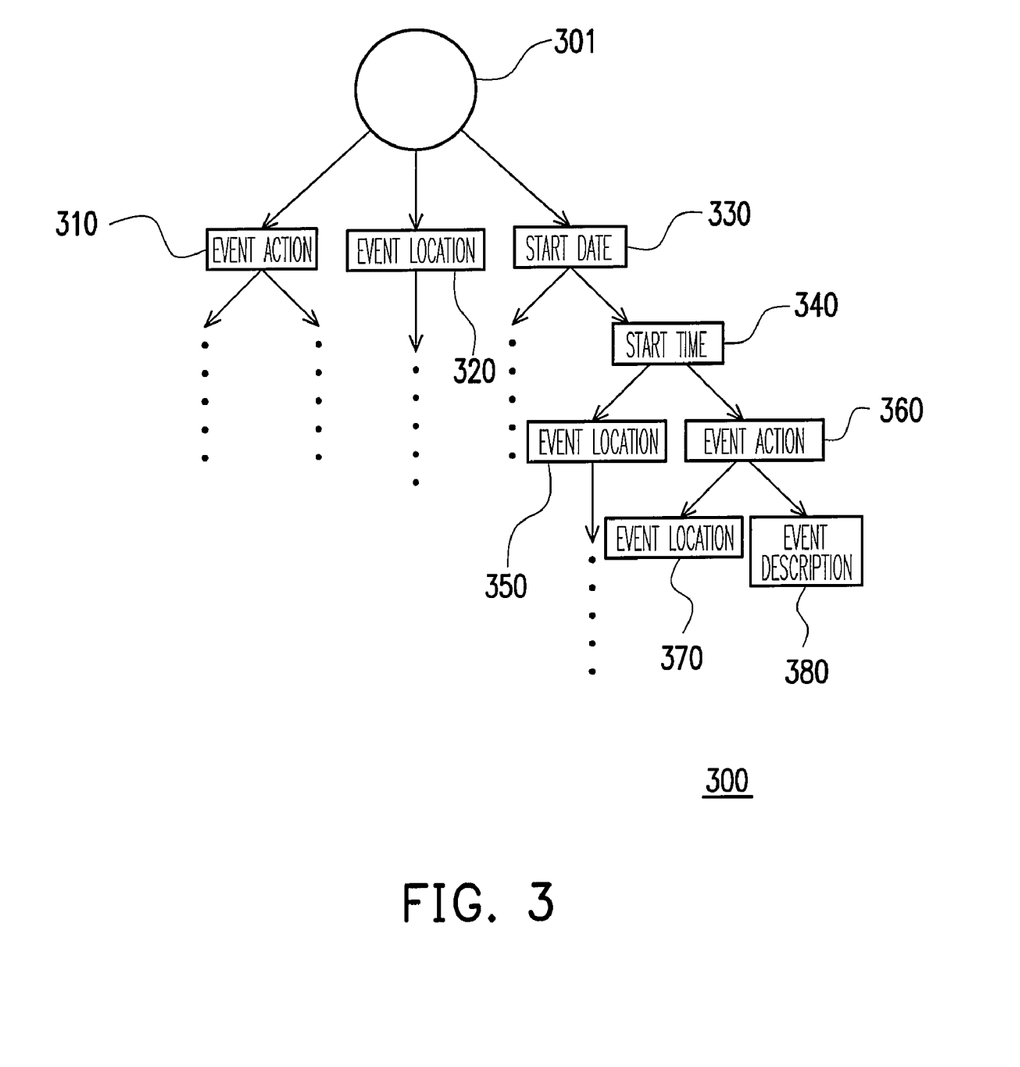
FIG. 3 is a partial schematic diagram of a semantic tree corresponding to a company internal meeting event type according to an exemplary embodiment of the present invention.

FIG. 3 is a partial schematic diagram of a semantic tree corresponding to the event type of "company internal meeting" in the event type database 130. Referring to FIG. 3, a path consists of root node 301, child node 330, child node 340, child node 360, and child node 380 exists in the semantic tree 300 corresponding to the event type of "company internal meeting", wherein the child nodes 330, 340, 360, and 380 respectively represent semantic classes "start date", "start time", "event action", and "event description". Many possible words have been predetermined in each semantic class, for example, the semantic class of "start date" may include words such as "today", "tomorrow", "Monday", "Tues", "1$^{st}$ September" etc. It should be mentioned here that the semantic class of "event description" may include words used frequently by the user, such as contact names, vendor names, or project titles, thus, possible words of the semantic class "event description" may be defined with the affiliations between some predetermined words and those words the user uses frequently. To be specific, words describing events like "requirement", "requirement of", "the requirement of", "specification of" are predetermined words in the semantic class of "event description", and undefined words adjacent to these predetermined words may also be considered as the possible words of "event description". For example, in foregoing text words, "vendor-A" belongs to undefined words, and it can be determined that the combination of "the", "requirement", "of", "vendor-A" belongs to the semantic class of "event description" according to those predetermined words and the affiliations between the predetermined words and those undefined words.

The foregoing action of binding text words to a semantic class is referred to as semantic interpretation. Accordingly, after semantic interpretation, "Tomorrow", "14:00", "discuss", "the", "requirement", "of", "vendor-A" become "Tomorrow", "14:00", "discuss", "the requirement of vendor-A", and the corresponding semantic classes are "start date", "start time", "event action" and "event description". In other words, there is a path composed of root node 301, child node 330, child node 340, child node 360, and child node 380 in the semantic tree 300 corresponding to the event type of "company internal meeting", and the semantic classes represented by the child nodes on this path match the semantic classes corresponding to the text words in the appearance order thereof, thus, the event type recognition module 120 determines that the input message corresponds to the event type of "company internal meeting".

Figure 4:
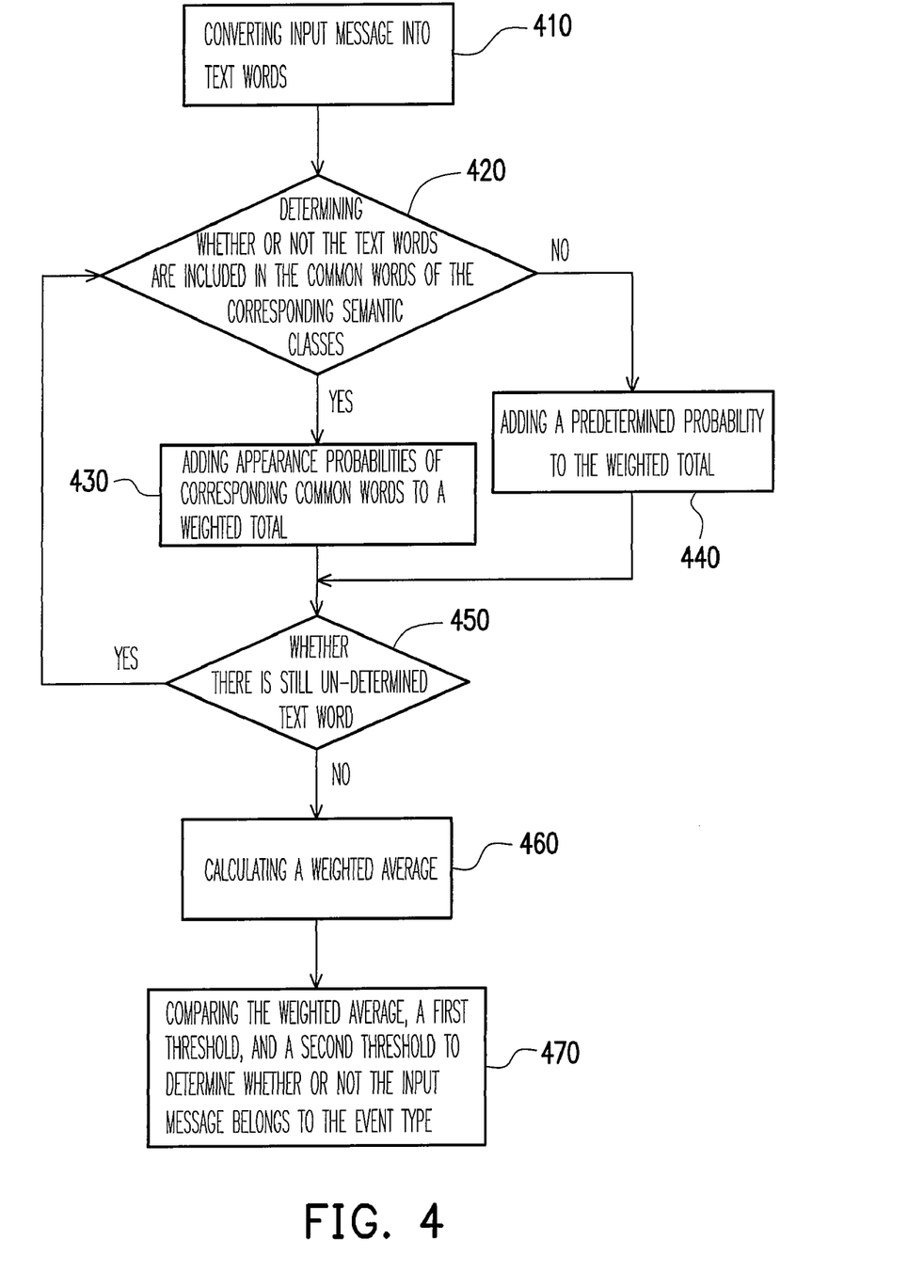
FIG. 4 is a flowchart illustrating a method for determining the event type corresponding to an input message according to an exemplary embodiment of the present invention.

In another embodiment of the present invention, a plurality of common words in each semantic class of each event type and the appearance probabilities of these words are pre-recorded in the event type database 130 through corpus collection. The event type recognition module 120 determines whether or not the input message corresponds to a particular event type according to those common words and their appearance probabilities. FIG. 4 is a flowchart illustrating a method for determining the event type corresponding to an input message according to an exemplary embodiment of the present invention. Referring to FIG. 4, first, the message receiving/processing module 110 converts the input message into a plurality of text words in step 410.

Next, in step 420, the foregoing text words are determined one by one whether or not they are included in the common words of the corresponding semantic classes of each event type by using data recorded in the event type database 130.

If a text word is one of the common words of a semantic class of a particular event type, the appearance probability of the corresponding common word is added to a weighted total in step 430; if the text word is not one of the common words of the semantic class of that event type, a predetermined probability is added to the weighted total in step 440. In the present embodiment, the predetermined probability may be smaller than the appearance probabilities of all the common words.

Next, check whether there is still undetermined text word in step 450; if so, the process returns to step 420 to continue determining whether or not the text word is one of the common words of the semantic class of the event type, and steps 430 and 440 are repeated; if all the text words have been checked, a weighted average is then calculated in step 460 based on the total number of text words and the weighted total, wherein the weighted average may be obtained by dividing the weighted total with the total number of the text words.

Finally, in step 470, whether or not the input message is corresponding to the event type is determined by comparing the weighted average, a first threshold, and a second threshold. For example, if the weighted average is greater than the first threshold of the event type, the input message is determined to be corresponding to the event type; otherwise if the weighted average is smaller than the second threshold of the event type, the input message is determined not to be corresponding to the event type.

In an embodiment of the present invention, "Tomorrow", "14:00", "discuss", "the requirement of vendor-A" are respectively common words in semantic classes "start date", "start time", "event action", "event description" of the event type "company internal meeting", and their appearance probabilities are respectively 0.9, 0.9, 0.8, and 0.7. Therefore the weighted average is 0.825. In the present embodiment, the first threshold and the second threshold of the event type "company internal meeting" are respectively 0.8 and 0.5. The weighted average (0.825) calculated according to the input message is greater than the first threshold. Accordingly, the event type recognition module 120 determines that the input message belongs to the event type of "company internal meeting".

In another embodiment of the present invention, if the event type recognition module 120 determines that the input message does not belong to any event type recorded in the event type database 130, the input message is then considered as a complementary message for complementing the execution information of previous input messages.

Referring to FIG. 2 again, next, as shown in step 230, the management module 140 collects all the necessary execution information for executing the event type according to the recognition result provided by the event type recognition module 120. It should be mentioned here that an input message may correspond to more than one event type. In such a case, the management module 140 acts regarding all the event types corresponding to this input message, namely, the management module 140 collects the necessary execution information of each event type corresponding to the input message.

In the following embodiment, the method for the management module 140 to collect the execution information will be described, and for the convenience of description, it is assumed that the input message only corresponds to the event type of "company internal meeting". First, the management module 140 finds out what execution information is required by "company internal meeting" according to records in the event type database 130. It is assumed that the event type of "company internal meeting" requires the execution information of "start time", "end time", "action", "subject", "event location", and "attendee", and each execution information may correspond to various semantic classes of the event type. For example, "start time" corresponds to semantic classes "start date" and "start time", "action" corresponds to semantic class "event action", and "subject" corresponds to semantic class "event description".

The management module 140 first collects the execution information according to the input message after the management module 140 has confirmed the necessary execution information of "company internal meeting". In this embodiment, the semantic classes corresponding to the input message "Tomorrow", "14:00", "discuss", "the requirement of vendor-A" are respectively "start date", "start time", "event action" and "event description"; therefore the execution information provided by the input message are "start time", "action", and "subject". The management module 140 may set the actual date (for example, $2^{nd}$ September) corresponding to "tomorrow" and "14:00" in the input message as the execution information "start time" according to system date and time, "discuss" as "action", and "the requirement of vendor-A" as "subject".

If the input message cannot provide all the execution information required by the event type of "company internal meeting", the management module 140 collects suitable execution information by looking up related data in the user database 150. In the present embodiment, the user database 150 may record calendar data and contact information of the user, and a plurality of usage history data tables. Referring to FIGS. 5~8, the usage history data tables may include the usage history data table 500 of meeting subjects and attendees, the usage history data table 600 of meeting time, the usage history data table 700 of meeting rooms, and the usage history data table 800 of attendees. Every usage history data recorded in each usage history data table has a quotation score which may be determined according to a quotation number and a number of no-quotation days of the usage history data. In the present embodiment, the quotation score of each the usage history data is calculated with the following formula:

Quotation score=quotation number×(1÷(number of no-quotation days+1)).

Figure 5:
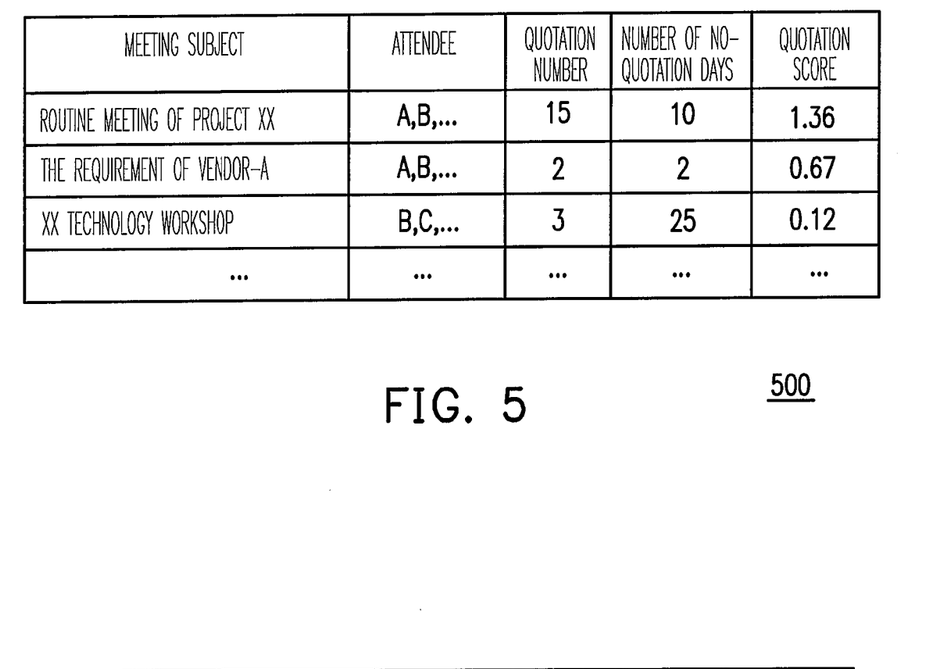
FIG. 5 is a schematic diagram of a usage history data table of meeting subjects and attendees according to an exemplary embodiment of the present invention.
Figure 6:
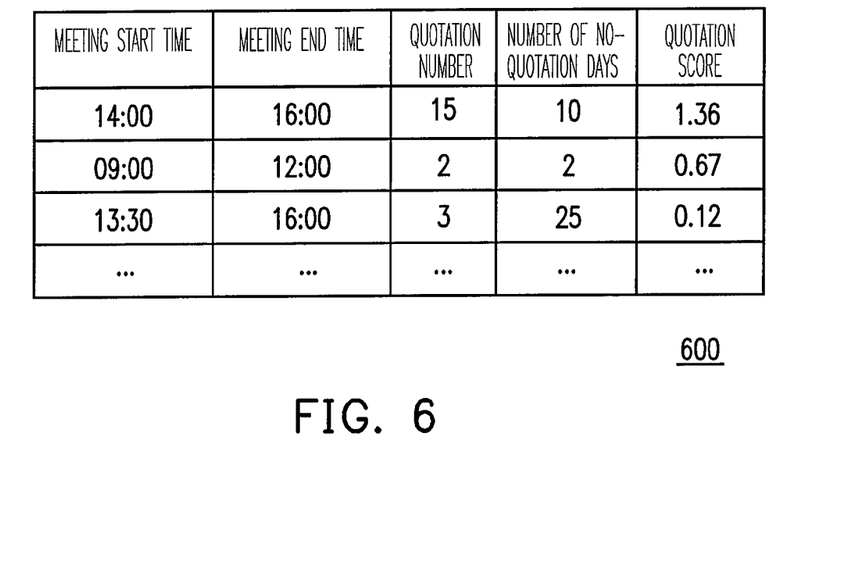
FIG. 6 is a schematic diagram of a usage history data table of meeting time according to an exemplary embodiment of the present invention.
Figure 7:
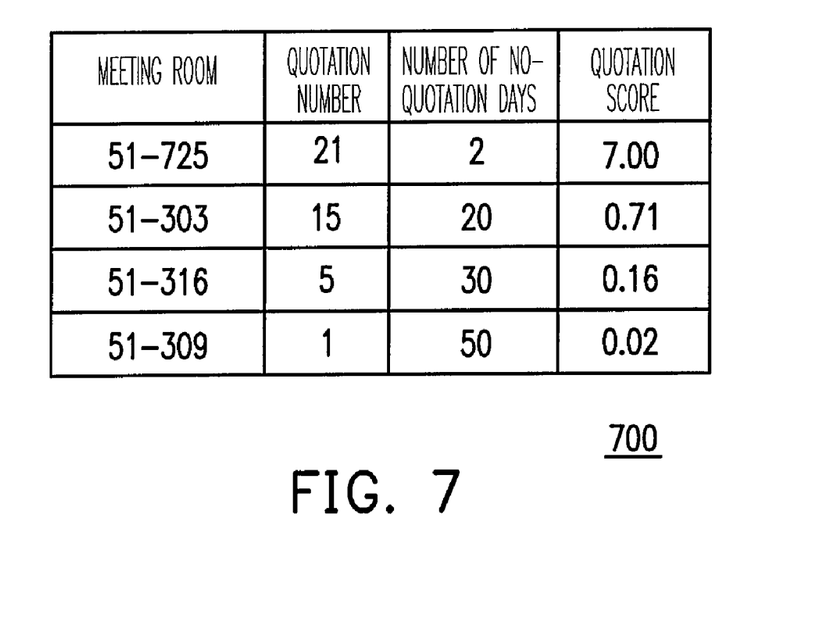
FIG. 7 is a schematic diagram of a usage history data table of meeting rooms according to an exemplary embodiment of the present invention.
Figure 8:
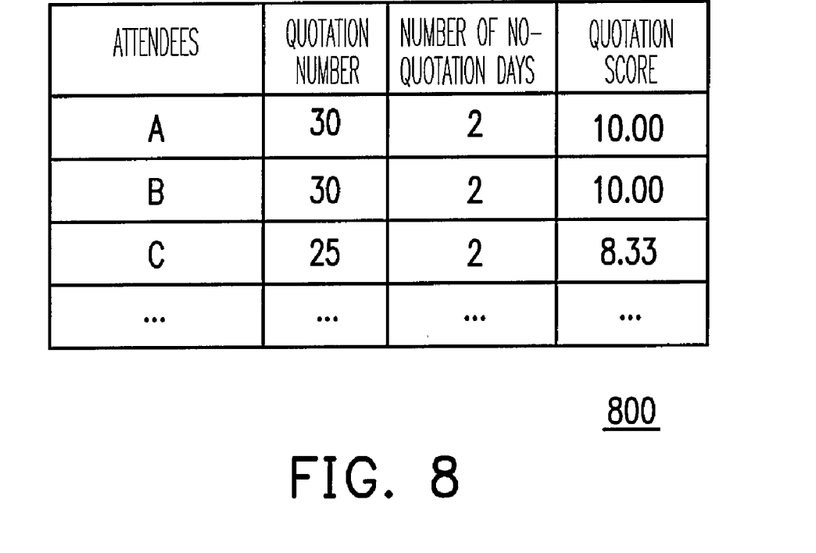
FIG. 8 is a schematic diagram of a usage history data table of meeting attendees according to an exemplary embodiment of the present invention.

As shown in FIG. 5, it is obvious according to the quotation scores that the user often holds meetings regarding project XX with attendees A, B, . . . ; similarly, as shown in FIG. 6, it can be observed that the user always holds meetings during 14:00~16:00; as shown in FIG. 7, it can be observed that the user always holds meetings in meeting room 51-725; and as shown in FIG. 8, it can be observed that the user always asks A and B to attend meetings. In the present embodiment, when the management module 140 needs to collect execution information from the user database 150, the management module 140 first looks up the usage history data tables corresponding to the lacking execution information of the event type "company internal meeting", and then selects the usage history data having the highest quotation score as the required execution information.

In an embodiment of the present invention, the event type "company internal meeting" is still short of the execution information about "end time", "event location", and "attendee". First, the management module 140 compares the usage history data table 600 of meeting time in the user database 150 and the contents of the execution information "start time" (for example, $2^{nd}$ September 14:00) and selects a meeting end time as the execution information "end time", wherein the selected meeting end time has the highest quotation score and dose not conflict with the contents of the execution information "start time". For example, referring to the second row in the meeting time usage history data table 600, the meeting start time 14:00 matches the content of the execution information "start time" (i.e. $2^{nd}$ September 14:00), thus, the management module 140 uses the content of the meeting end time in the second row of the meeting time usage history data table 600 (i.e. 16:00) as the execution information "end time".

After referring to the meeting room usage history data table 700, the management module 140 selects the meeting room 51-725 which has the highest quotation score as the execution information "event location" of the event type "company internal meeting".

Before determining the execution information "attendee", it has to be determined first that whether or not any data recorded in the "meeting subject" field of the usage history data table 500 of meeting subjects and attendees matches the contents of the execution information "subject". As shown in the third column of the usage history data table 500 of meeting subjects and attendees, the meeting subject "the requirement of vendor-A" matches the execution information of "subject". Therefore the management module 140 uses the data "A, B, . . . " in the third field "attendee" of the usage history data table 500 of meeting subjects and attendees as the execution information "attendee". If no meeting subject in the usage history data table 500 of meeting subjects and attendees matching the execution information "subject" can be found, the management module 140 refers to the attendees usage history data table 800 and selects the "attendee" having the highest quotation score as the execution information "attendee".

However, if the user database 150 still can not provide all the necessary execution information, the management module 140 notifies the message transmitting/processing module 160 to send an information complement request message to the user or to another correlative service execution system for obtaining the complementary execution information. For example, if the user provides 12:00 as the start time of the meeting but does not provide an end time of the meeting, and the meeting start time is not found in the meeting time usage history data table 600, the management module 140 notifies the message transmitting/processing module 160 to send a meeting end time request message to the user for obtaining a necessary execution information of the event type.

After the management module 140 has collected all the necessary execution information of that event type, the management module 140 sends an information confirmation request message, for example, to the user of the correlative service execution system 100 or a correlative service execution system of another meeting attendee through the message transmitting/processing module 160, and then the management module 140 determines whether or not the foregoing execution information is correct according to the information confirmation response message sent by the other party. If the execution information is correct, the learning/recording module 170 in the correlative service execution system 100 updates the user database 150 in order to perform a message recording and learning operation so that the correlative service execution system 100 can be more adaptive to the user's habits. With the foregoing "company internal meeting" as example, the quotation number of the usage history data in the third column of the usage history data table 500 of meeting subjects and attendees (i.e. meeting subject "the requirement of vendor-A" and attendees "A, B, . . . ") is changed from 2 to 3, and the number of no-quotation days is updated to 0, so that the quotation score thereof is changed from 0.67 to 3. All the related usage history data tables in the user database 150 are also updated to learn the habits of the user at any moment.

However, if the information confirmation response message shows that the execution information is incorrect, the management module 140 notifies the message transmitting/processing module 160 to send an information correction request message for obtaining corrected execution information. In the present embodiment, the messages transmitted by the message transmitting/processing module 160 have the same format as the messages received by the message receiving/processing module 110. In other words, if the messages received by the message receiving/processing module 110 are text messages, the messages transmitted by the message transmitting/processing module 160 are also text messages, and if the messages received by the message receiving/processing module 110 are voice messages, then the messages transmitted by the message transmitting/processing module 160 are also voice messages.

Referring to step 240 in FIG. 2, after all the necessary execution information of the event type has been collected and confirmed to be correct, the system 100 enters the event type correlative services 180 to sequentially execute all the correlative services of this event type. For example, the steps required to execute all the correlative services of the event type "company internal meeting" include "preserving meeting room", "sending meeting notifications to attendees", and "recording meeting message in user's calendar" etc. First, suitable data is provided according to the execution information required by each correlative service and corresponding operations are carried out. For example, start time "9/2 14:00", end time "9/2 16:00", and event location "meeting room 51-725" are provided to the service of "preserving meeting room" to preserve a meeting room. Next, the service of "sending meeting notifications to attendees" is executed to notify those meeting attendees of the foregoing meeting message (i.e. start time "9/2 14:00", end time "9/2 16:00", action "discuss", subject "the requirement of vendor-A", event location "meeting room 51-725"), wherein the message is transmitted to the email addresses of those attendees obtained from contact information recorded in the user database 150. Finally, the service of "recording meeting message in user's calendar" is executed to record the meeting message into the calendar data in the user database 150, thus completing all the correlative services of the event type "company internal meeting".

It should be mentioned here that besides executing correlative services corresponding to an input message provided by a user, the event type recognition module 120 in the correlative service execution system 100 may also perform semantic analysis to an input message containing negative words such as "cancel", "delete", "no" etc, so as to allow the management module 140 to delete the execution information corresponding to a previous input message, for example, to cancel some attendees or to cancel executing the event type corresponding to the previous input message.

In another embodiment of the present invention, after a user A sends a meeting notification to a user B through a correlative service execution system X, the correlative service execution system Y of the user B receives the meeting notification message (including data of attendees) and understands that the input message is a meeting notification through the foregoing procedure. Through the built-in management module of the correlative service execution system Y and the usage history data table of meeting subjects and attendees recorded in the user database, the correlative service execution system Y automatically finds out that the meeting attendees are not consistent with what is recorded in the usage history data table of meeting subjects and attendees (for example, lacking a new employee D who attended the previous meeting). The correlative service execution system Y then sends a message "9/2 14:00 to 9/2 16:00 meeting room 51-725 discuss the requirement of vendor-A, add attendee D, basic information of attendee D: email address DDD@itri.org.tw, telephone 03-5678888 . . . " to the correlative service execution system X of user A through the built-in message transmitting/processing module. After the correlative service execution system X has received the message, the correlative service execution system X adds the basic information of the attendee D through its management module, updates and re-sends the meeting notification to all attendees (including user D), and updates the user database. After the correlative service execution system Y receives the updated meeting notification message, the correlative service execution system Y replies a message of "9/2 14:00 to 9/2 16:00 meeting room 51-725 discuss the requirement of vendor-A, approved" to the correlative service execution system X to complete the entire operation. Therefore, insufficient personal information can be completed through the communication of two correlative service execution systems, and messages about whether or not those attendees can attend the meeting can be collected instantly.

The method and system in the present invention can receive messages through multimedia communication channels or human-computer interfaces and can process voice messages. Thus, messages can be input in a more flexible way.

After determining the event type corresponding to the input message, the system in the present invention automatically collects all necessary execution information of the correlative services of the event type by looking up the input message, a user database, and by inquiring the user or another correlative service execution system, and then the system automatically executes those correlative services. Accordingly, the method and system in the present invention can help the user to complete various complicated tasks more efficiently.

The method and system in the present invention provides information feedback procedures such as confirmation and rejection, and adopts a message recording and learning mechanism to adjust related data according to each input message, so as to get hold of the user's expression habit and related information of the user's routine events, thus improving system accuracy.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for executing correlative services, comprising:
   providing an input message;
   providing an event type database recording at least one common word in each semantic class of an event type and an appearance probability of each said common word;
   converting the input message into at least one text word;
   determining whether or not each said text word is one of the common words of the corresponding semantic class;
   adding the appearance probability of the corresponding common word to a weighted total if the text word is one of the common words;
   adding a predetermined probability to the weighted total if the text word is not one of the common word;
   calculating a weighted average according to the weighted total and a total number of the text words;
   comparing the weighted average with a first threshold and a second threshold to determine whether or not the input message belongs to the event type;
   collecting each necessary execution information of the event type; and
   sequentially executing at least one correlative service of the event type.

2. The execution method as claimed in claim 1, wherein the method for providing the input message comprises text input or voice input.

3. The execution method as claimed in claim 1, wherein the step of comparing the weighted average and the first and the second threshold to determine whether or not the input message belongs to the event type comprises:
   determining that the input message belongs to the event type if the weighted average is greater than the first threshold; and
   determining that the input message does not belong to the event type if the weighted average is smaller than the second threshold.

4. The execution method as claimed in claim 1, wherein the step of determining the event type corresponding to the input message according to the event type database further comprises:

considering the input message as a complementary message for complementing the execution information if the input message does not belong to any event type.

5. The execution method as claimed in claim 1, wherein the step of collecting each said necessary execution information of the event type comprises:

collecting each said necessary execution information of the event type according to the input message;

looking up a user database to obtain each said necessary execution information of the event type if the necessary execution information is not fully available; and sending an information complement request message to obtain complementary execution information if the necessary execution information is still not fully available.

6. The execution method as claimed in claim 5, wherein the user database comprises at least one usage history data table and each usage history data in each said usage history data table comprises a quotation score, wherein the quotation score is determined according to a quotation number and a number of no-quotation days of the usage history data, the step of looking up the user database to collect each said necessary execution information of the event type comprises:

selecting the usage history data having the highest quotation score as the execution information of the event type from the usage history data table corresponding to the necessary execution information of the event type.

7. The execution method as claimed in claim 5, wherein after collecting all the necessary execution information of the event type, the execution method further comprises:

sending an information confirmation request message and determining whether or not the execution information is correct according to an information confirmation response message;

updating the user database according to the execution information if the execution information is correct; and sending an information correction request message to obtain a corrected execution information if the execution information is incorrect.

8. The execution method as claimed in claim 5, wherein the step of executing the correlative service further comprises:

comparing all the execution information of the correlative service and the user database and sending an information correction request message to obtain a corrected execution information if the execution information of the correlative service does not match the user database; and updating the user database according to the corrected execution information and re-executing the correlative service.

9. The execution method as claimed in claim 1 further comprising:

deleting the execution information corresponding to the input message or canceling executing the event type corresponding to the input message.

10. A system for executing correlative services, comprising:

a message receiving/processing module, configured for receiving an input message and converting the input message into at least one text word, wherein the text words have an appearance order;

an event type database, recording the characteristics of an event type, and recording at least one common word in each semantic class of the event type and an appearance probability of each said common word;

an event type recognition module, connected to the message receiving/processing module and the event type database, for adding the appearance probability of the corresponding common word to a weighted total if the text word is one of the common words of the corresponding semantic class, adding a predetermined probability to the weighted total if the text word is not one of the common words of the corresponding semantic class, calculating a weighted average according to the weighted total and a total number of the text words, comparing the weighted average with a first threshold and a second threshold to determine whether or not the input message belongs to the event type;

a user database, recording a related information of a user;

a management module, connected to the message receiving/processing module, the event type recognition module, the event type database, and the user database, for collecting each necessary execution information of the event type and starting up at least one correlative service of the event type; and a message transmitting/processing module, configured for allowing the system for executing correlative services to communicate with a user or another system for executing correlative services through message transmission.

11. The execution system as claimed in claim 10, wherein the input message comprises a text message or a voice message.

12. The execution system as claimed in claim 10, wherein the event type recognition module determines that the input message belongs to the event type if the weighted average is greater than the first threshold, and the event type recognition module determines that the input message dose not belong to the event type if the weighted average is smaller than the second threshold.

13. The execution system as claimed in claim 10, wherein the event type recognition module further considers the input message as a complementary message for complementing the execution information after the event type recognition module determines that the input message does not belong to any event type.

14. The execution system as claimed in claim 10, wherein the management module notifies the message transmitting/processing module to send an information complement request message to a user or another system for executing correlative services for obtaining a complementary execution information if the management module cannot fully collect all the necessary execution information of the event type after the management module has looked up both the input message and the user database.

15. The execution system as claimed in claim 10, wherein the user database comprises at least one usage history data table and each usage history data in each said usage history data table comprises a quotation score, wherein the quotation score is determined according to a quotation number and a number of no-quotation days of the usage history data, the management module further selects the usage history data having the highest quotation score as the execution information of the event type from the usage history data table corresponding to the execution information of the event type.

16. The execution system as claimed in claim 10, further comprising:

a learning/recording module, connected to the management module and the user database, configured for updating the user database according to the execution information collected by the management module.

17. The execution system as claimed in claim 10, wherein while executing the correlative service, the message transmitting/processing module sends an information correction request message to the user or another system for executing correlative services to obtain a corrected execution information and re-execute the correlative service if the execution information of the correlative service does not match the user database.

18. The execution system as claimed in claim 10, wherein the management module further comprises deleting the execution information corresponding to the input message or cancelling the execution of the event type corresponding to the input message.

19. A method for executing correlative services, comprising:
providing an input message;
providing an event type database comprising at least one semantic tree respectively representing different event types, and each said semantic tree comprises a root node and at least one child node, wherein each said child node represents a semantic class;
converting the input message into at least one text word, wherein the text words have an appearance order;
searching downwards for the semantic classes of the text words from the root node of each said semantic tree according to the appearance order and the semantic class of each said text word;
determining that the input message belongs to the event type represented by one of the semantic trees if a path exists in the semantic tree and the semantic classes represented by the child nodes on the path match the semantic classes of the text words in the appearance order;
collecting each necessary execution information of the event type; and
sequentially executing at least one correlative service of the event type.

20. A system for executing correlative services, comprising:
a message receiving/processing module, configured for receiving an input message and converting the input message into at least one text word, wherein the text words have an appearance order;
an event type database, comprising at least one semantic tree respectively representing different event types, and each said semantic tree comprises a root node and at least one child node, wherein each said child node represents a semantic class;
an event type recognition module, connected to the message receiving/processing module and the event type database, for converting the input message into at least one text word, wherein the text words have an appearance order, searching downwards for the semantic classes of the text words from the root node of each said semantic tree according to the appearance order and the semantic class of each said text word, determining that the input message belongs to the event type represented by one of the semantic trees if a path exists in the semantic tree and the semantic classes represented by the child nodes on the path match the semantic classes of the text words in the appearance order;
a user database, recording a related information of a user;
a management module, connected to the message receiving/processing module, the event type recognition module, the event type database, and the user database, for collecting each necessary execution information of the event type and starting up at least one correlative service of the event type; and
a message transmitting/processing module, configured for allowing the system for executing correlative services to communicate with a user or another system for executing correlative services through message transmission.

* * * * *